United States Patent
Imai et al.

[11] 3,843,080
[45] Oct. 22, 1974

[54] MOUNTING DEVICE FOR DEPENDING STRUCTURAL MEMBERS FROM DECK PLATE OR THE LIKE

[75] Inventors: Hiroshi Imai; Momoki Nakagawa, both of Tokyo, Japan

[73] Assignee: ITT Industries, Inc., New York, N.Y.

[22] Filed: June 18, 1971

[21] Appl. No.: 154,324

[30] Foreign Application Priority Data
Feb. 25, 1971 Japan.............................. 46-10952
May 7, 1971 Japan............................... 46-14942

[52] U.S. Cl. ...................... 248/58, 52/698, 85/3 S, 85/80, 248/54 R, 248/59, 248/343
[51] Int. Cl. ............................. F161, F168 3/00
[58] Field of Search............ 248/54 R, 59, 71, 327, 248/343; 85/80, 3 S, 83 S, 83 R; 52/707, 484, 698, 336; 151/69; 24/73 SP, 73 PP

[56] References Cited
UNITED STATES PATENTS

| | | | |
|---|---|---|---|
| 1,049,376 | 1/1913 | LeManquais | 85/80 |
| 1,260,331 | 3/1918 | Collins | 52/707 X |
| 1,510,978 | 10/1924 | Conklin | 52/711 X |
| 1,876,640 | 9/1932 | Dobson | 151/69 |
| 2,019,236 | 10/1935 | Richter | 52/699 X |
| 2,119,764 | 6/1938 | Young | 85/DIG. 3 |
| 2,318,548 | 5/1943 | Whitehead et al. | 83/3 R |
| 2,387,468 | 10/1945 | Ritzel | 85/3 S |
| 2,746,355 | 5/1956 | Wells | 248/216 X |
| 2,836,215 | 5/1958 | Rapata | 85/80 |
| 3,001,252 | 9/1961 | Erickson et al. | 151/69 X |
| 3,372,523 | 3/1968 | Hall | 52/336 |
| 3,390,854 | 7/1968 | Sherburne | 248/55 |
| 3,487,744 | 1/1970 | Montana | 85/3 R |
| 3,500,607 | 3/1970 | Wilson | 52/699 |
| 3,552,734 | 1/1971 | Severino | 52/699 X |

FOREIGN PATENTS OR APPLICATIONS

| | | | |
|---|---|---|---|
| 1,355,697 | 2/1964 | France | 85/80 |
| 553,142 | 5/1943 | Great Britain | 85/3 R |
| 1,412,101 | 4/1967 | France | 248/59 |

Primary Examiner—Roy D. Frazier
Assistant Examiner—Rodney H. Bonck
Attorney, Agent, or Firm—Silverman & Cass

[57] ABSTRACT

A mounting device for a hanger bolt for ceiling bolt, pipe or the like wherein a spring is fitted onto a bolt having projections formed on its periphery and threaded portion so that the spring is stopped by the projections. A washer is then fitted onto the bolt and a threaded cylinder covered with a plastic skirt is threadably engaged with the threaded portion of the bolt to complete an entire assembly.

7 Claims, 6 Drawing Figures

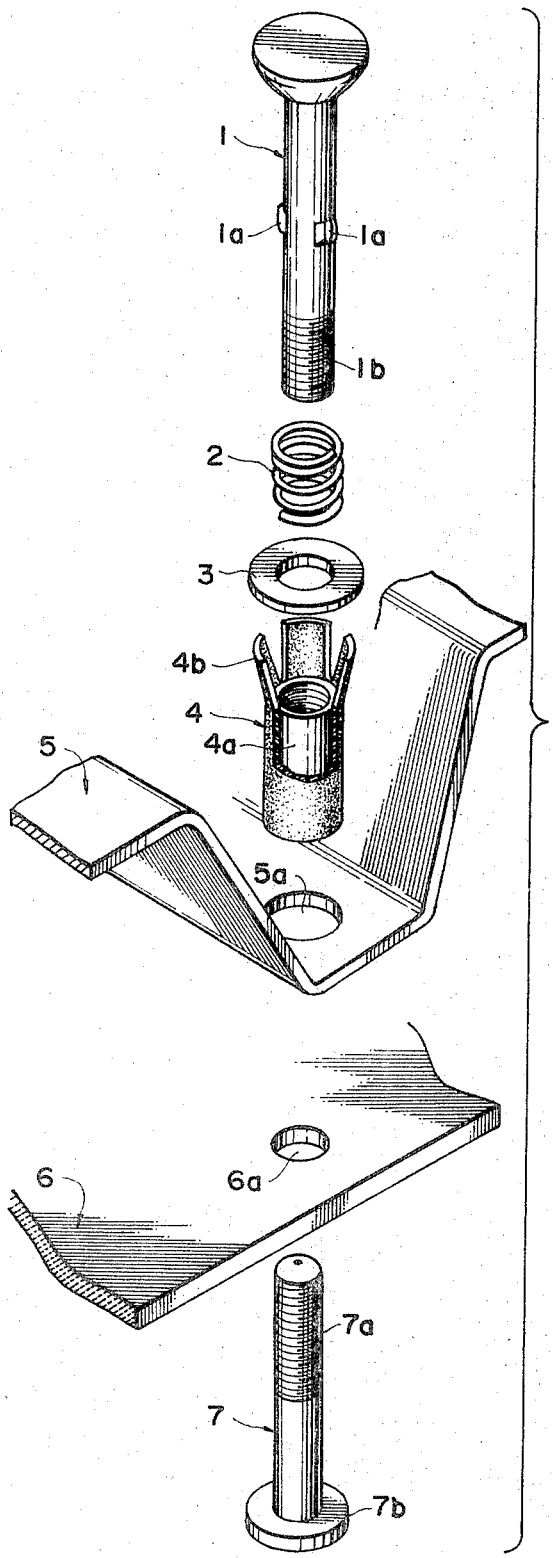
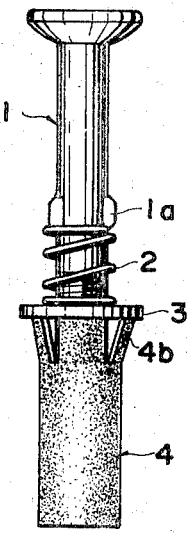
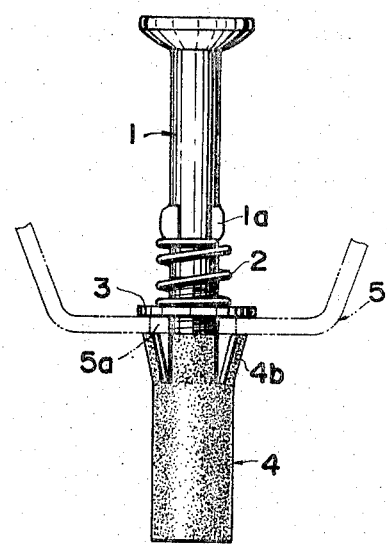

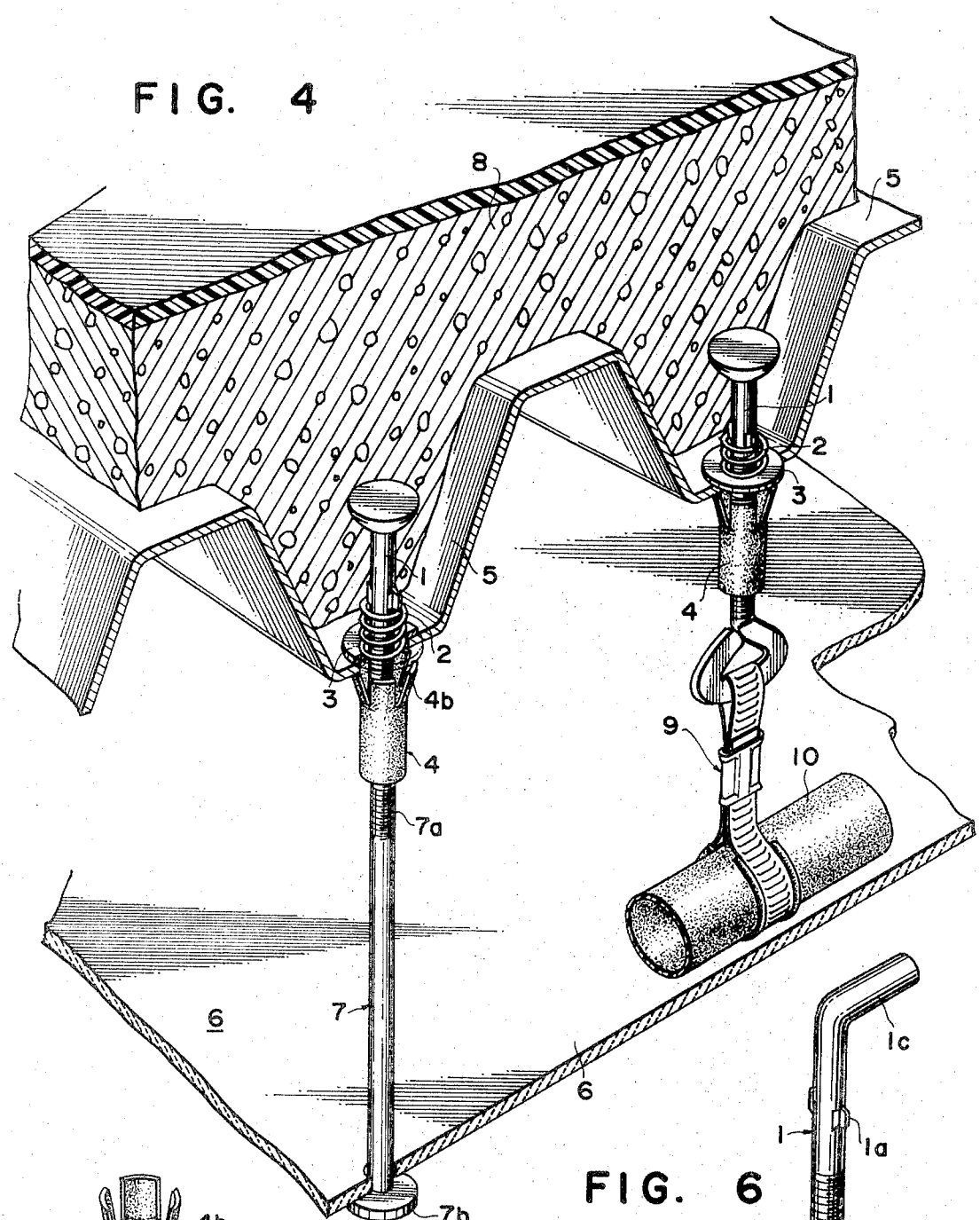

MOUNTING DEVICE FOR DEPENDING STRUCTURAL MEMBERS FROM DECK PLATE OR THE LIKE

SUMMARY OF THE INVENTION

The present invention relates to a mounting device for a hanger bolt for hanging a ceiling board, a pipe, electric wire or the like from a floor.

It is an object of the present invention to fix a hanger bolt perpendicularly to a deck plate merely by inserting the hanger bolt with a plastic skirt from upside into a bore in the deck plate.

It is another object of the present invention to suspend a ceiling board horizontally by threading a support bolt for suspending the ceiling board into a thread hole formed in a plastic skirt.

It is a further object of the present invention to hang a pipe (Including electric wires) at the tip end of a hanging device by threadably mounting the hanging device into said threaded hole.

It is a still further object of the present invention to embed and secure a portion of bolt lying above washer by flowing concrete into upper surface of the deck plate since it is possible to fix the hanger bolt to the hole in the deck plate through one-touch action.

The construction of the device in accordance with the present invention will now be described in more detail with reference to the accompanying drawings.

BRIEF DESCRIPTION OF THE DRAWINGS

In the accompanying drawing:

FIG. 1 is an exploded view of a hanger bolt and fragmentary view of a deck plate, a ceiling plate and a ceiling support bolt;

FIG. 2 shows an overall construction of the hanger bolt assembled in one unit, which is a principal part of the present invention;

FIG. 3 is a front view of the hanger bolt showing the hanger bolt fixed by being inserted into the deck plate;

FIG. 4 illustrate a preferred form of the present invention in which concrete is poured onto the deck plate and a ceiling plate and a pipe are hung by the hanger bolt;

FIG. 5 shows a threaded cylinder having at the top thereof a skirt comprising spread split pieces; and FIG. 6 is a perspective view of a bolt having a curved portion at the top thereof.

DETAILED DESCRIPTION OF THE INVENTION

Referring to FIG. 2 which shows an overall construction of the hanger bolt in accordance with the present invention, a spring 2 is fitted to a bolt 1 having projections 1a on its periphery and having a threaded portion 1b so that the spring 2 is stopped by the projections 1a. Then a washer 3 is fitted and a threaded cylinder 4a coated by a plastic skirt 4 is threadably engaged with the thread 1b of the bolt.

A deck plate 5 is of waved shape or flat plate and formed with a bore 5a which is large enough to permit insertion of the plastic skirt therethrough. When the hanger bolt is inserted into the bore 5a from the above, the split pieces 4b of the skirt pass through the bore in their shrinked position and as soon as they have passed through the bore they resiliently spread outwardly and the deck plate is stopped by the washer 3. At this moment the spring 2 is compressed and it strongly forces the washer 3 towards the deck plate 5. At the same time, the split pieces 4b underside of the deck plate 5 spread and press itself to the deck plate. Thus, the deck plate 5 is sandwitched by the washer 3 from upside and the split pieces 4b from downside. For this end, the bolt 1 is secures perpendicularly to the deck plate 5.

Then, concrete 8 is poured onto the deck plate and cured while the bolt 1 is embedded. Thus, since the threaded cylinder 4a is also held perpendicularly, the ceiling support bolt 7 which is adapted to threadably engage through a bore 6a in the ceiling board is also maintained perpendicularly. The ceiling board 6 supported by a flange member 7b of the support bolt is thereof held horizontally. By rotating the screw 7a, the ceiling board may be moved up and down with ease. By threadably emgaging a hanger device 9 for a pipe 10 with the threaded cylinder 4a, it is possible to hang pipe, electric wire or the like. Since better appearance is provided where the pipe 10 lies inside of the ceiling plate 6, preferably the hanger device 9 is made shorter than the ceiling support bolt 7.

The deck plate 5 is advantageously provided with the hanger bolt for the ceiling board and the hanger device for the pipe in an appropriate position and the plastic skirts 4 are colored to distinguish themselves in order to facilitate to hang the ceiling board and the pipe separately. The splits in the skirt serve to maintain the bolt in perpendicular position but such action of the splits is no longer necessary after the concrete has been cured.

FIG. 5 shows the threaded cylinder 4a covered with the skirt having splits 4b. In this case, since the thread 1b of the bolt threadably engages with the threaded cylinder 4a, the splits 4b may be firmly secured. The curved top 1c of the bolt shown in FIG. 6 improves the binding effect with the concrete 8.

The hanger bolt of the present invention will be marketed as an assembly as shown in FIG. 2. When the assembly is inserted into the bore in the deck plate, it will be secured to the deck plate in a manner shown in FIG. 3. Then concrete may be poured onto the deck plate. Thus a rapid work is realized. In the past the work for hanging ceiling board or the like has been troublesome in maintaining the same horizontally, however, the present invention enables efficient and precise work to be realized.

What is claimed is:

1. A mounting device for depending structural members from deck plate or the like, the deck plate adapted to have concrete poured onto the upper surface thereof to anchor the device to said deck plate, which comprises:
   A. a bolt having projecting means thereon,
   B. a spring fitted to said bolt below said projection means and having the upper end stopped by said projection means,
   C. a generally cylindrical member engaged with the lower end of the bolt,
   D. resilient expandable means associated with said cylindrical member and located at least at the upper end of the cylindrical member,
   E. said cylindrical member and expandable means adapted to be pushed axially through a hole in the said deck plate from the upper surface thereof by pressing down on the upper end of the bolt and thereby bringing the edge of the hole into constricting engagement with said expandable means to enable passage of said expandable means and cylindrical member, but said expandable means adapted to expand after passing the hole to the bottom surface of said deck plate, F. said spring adapted to be compressed between said projection means and said upper surface while said bolt is being pressed downward and serving upon release of said bolt to bias the bolt to move upward, G. said expandable means having structure adapted to engage the lower surface of said deck plate to maintain the bolt erect on account of the action of said spring while resisting withdrawal of said bolt through said hole from above said deck plate, H. means on said cylindrical member for coupling of a depending structural member to the bottom end of said bolt.

2. The mounting device as claimed in claim 1 in which the cylindrical member and the bottom end of the bolt are cooperatingly threaded one to the other.

3. The mounting device as claimed in claim 1 in which the cylindrical member and expandable means are a unitary structure.

4. The mounting device as claimed in claim 1 in which said spring is a coiled spring generally coaxial with said bolt and there is a flat washerlike member between the spring and the expandable means to prevent their engaging one another, while serving as a base for the spring when the expandable means has been pushed through the hole.

5. The mounting device as claimed in claim 1 in which the expandable means include upwardly and outwardly flared split skirt means joined at the bottom end thereof and the structure adapted to engage the lower surface of the deck plate comprise the free axial ends of said skirt means.

6. The mounting device as claimed in claim 1 in which said bolt has an offset head at the upper end thereof.

7. The mounting device as claimed in claim 1 in which said projection means comprise at least one protrusion formed on said bolt spaced downward from the upper end thereof.

* * * * *